(12) United States Patent
Jacobs et al.

(10) Patent No.: US 9,111,202 B2
(45) Date of Patent: *Aug. 18, 2015

(54) PRESENTATION-BASED QUALITY DETERMINATION

(71) Applicant: Mimeo.com, Inc., New York, NY (US)

(72) Inventors: Craig Jacobs, Patterson, NY (US);
David J. Uyttendaele, New York, NY (US); Chuck Gehman, Kettering, OH (US); James P. Simpson, Boston, MA (US); Austin Bergstrom, Raleigh, NC (US)

(73) Assignee: Mimeo.com, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,740

(22) Filed: May 5, 2014

(65) Prior Publication Data

US 2014/0240730 A1 Aug. 28, 2014

Related U.S. Application Data

(63) Continuation of application No. 13/152,636, filed on Jun. 3, 2011, now Pat. No. 8,717,619.

(51) Int. Cl.
*G06K 15/02* (2006.01)
*G03F 3/10* (2006.01)
*H04N 1/46* (2006.01)

(52) U.S. Cl.
CPC .......... *G06K 15/1872* (2013.01); *G06K 15/027* (2013.01); *G06K 15/1884* (2013.01)

(58) Field of Classification Search
USPC ........................... 358/1.9, 527, 537
See application file for complete search history.

(56) References Cited

U.S. PATENT DOCUMENTS

| 8,107,141 | B2 | 1/2012 | Patrick et al. |
| 8,218,164 | B2 | 7/2012 | German |

OTHER PUBLICATIONS

Evaluating Image Quality in Photography, http://e-articles.info/e/a/title/Evaluating-Image-Quality-In Photography, Printed May 19, 2011, 1 page.
Unique photo gifts and personalized gifts by Light Affection, http://www.lightaffection.com/.Copyright 2002-2010, Light Affection, 3 pages.
Resolution for print viewing distance, Northlight Images. Photography Articles by Keith Cooper, http://www.northlightimages.co.uk/article_pages/print_viewing_distance.html, Site contents Copyright 1975-2011 Keith Cooper, 4 pages.
Baker, Notice of Allowance for U.S. Appl. No. 13/152,636, Dec. 18, 2013, 8 pages.
Baker, Office Action for U.S. Appl. No. 13/152,636, Jul. 17, 2013, 13 pages.

*Primary Examiner* — Charlotte M Baker
(74) *Attorney, Agent, or Firm* — LaBatt, LLC

(57) ABSTRACT

A solution for evaluating a printing configuration for an electronic document in which one or more presentation attributes of a physical reproduction (e.g., a printed copy) of the electronic document are considered. A perceived quality of the physical reproduction of the electronic document can be determined using a set of properties of the electronic document and the one or more presentation attributes. The perceived quality can be utilized in various ways as part of a printing process.

20 Claims, 5 Drawing Sheets

PRESENTATION-BASED QUALITY DETERMINATION

REFERENCE TO RELATED APPLICATIONS

The current application is a continuation of co-pending U.S. patent application Ser. No. 13/152,636, titled "Presentation-Based Quality Determination," which was filed on 3 Jun. 2011, and which is hereby incorporated by reference.

TECHNICAL FIELD

The disclosure relates generally to document printing, and more particularly, to determining a perceived quality of a printed document.

BACKGROUND ART

Frequently, a print provider will issue an image quality warning based on static information of the image. For example, a print provider may require a minimum quality threshold of 300 dots per inch (dpi) for the horizontal resolution of an image to be printed. When an image quality is determined to be below the threshold, the print provider can issue a warning or reject the image for printing. While a particular threshold can vary among providers, it is typically determined by best practices and/or by the experience of the print provider. Such static quality thresholds do not take into consideration an intended use of the printed image.

SUMMARY OF THE INVENTION

Aspects of the invention provide a solution for evaluating a printing configuration for an electronic document in which one or more presentation attributes of a physical reproduction (e.g., a printed copy) of the electronic document are considered. A perceived quality of the physical reproduction of the electronic document can be determined using a set of properties of the electronic document and the one or more presentation attributes. The perceived quality can be utilized in various ways as part of a printing process.

A first aspect of the invention provides a computer-implemented method comprising: obtaining at least one presentation attribute of a physical reproduction of an electronic document during an intended use of the physical reproduction of the electronic document; and determining a perceived quality for the physical reproduction of the electronic document in response to obtaining the at least one presentation attribute, wherein the determining is based on at least one of a set of electronic document properties corresponding to the electronic document and the at least one presentation attribute of the intended use of the physical reproduction of the electronic document.

A second aspect of the invention provides a computer system comprising: a component for evaluating a printing configuration for an electronic document by performing a method of: obtaining at least one presentation attribute of a physical reproduction of the electronic document during an intended use of the physical reproduction of the electronic document; and determining a perceived quality for the physical reproduction of the electronic document in response to obtaining the at least one presentation attribute, wherein the determining is based on at least one of a set of electronic document properties corresponding to the electronic document and the at least one presentation attribute of the intended use of the physical reproduction of the electronic document.

A third aspect of the invention provides a computer program comprising program code embodied in at least one computer-readable medium, which when executed, enables a computer system to implement a method of evaluating a printing configuration for an electronic document, the method comprising: obtaining at least one presentation attribute of a physical reproduction of the electronic document during an intended use of the physical reproduction of the electronic document; and determining a perceived quality for the physical reproduction of the electronic document in response to obtaining the at least one presentation attribute, wherein the determining is based on at least one of a set of electronic document properties corresponding to the electronic document and the at least one presentation attribute of the intended use of the physical reproduction of the electronic document.

A fourth aspect of the invention provides a method of generating a computer system, the method comprising: providing a computer system for evaluating a printing configuration for an electronic document, wherein the computer system is configured to perform a method comprising: obtaining at least one presentation attribute of a physical reproduction of the electronic document during an intended use of the physical reproduction of the electronic document; and determining a perceived quality for the physical reproduction of the electronic document in response to obtaining the at least one presentation attribute, wherein the determining is based on at least one of a set of electronic document properties corresponding to the electronic document and the at least one presentation attribute of the intended use of the physical reproduction of the electronic document.

A fifth aspect of the invention provides a method comprising: at least one of providing or receiving a copy of a computer program that is encoded in a set of data signals, wherein the computer program enables a computer system to implement a method of evaluating a printing configuration for an electronic document, the method comprising: obtaining at least one presentation attribute of a physical reproduction of the electronic document during an intended use of the physical reproduction of the electronic document; and determining a perceived quality for the physical reproduction of the electronic document in response to obtaining the at least one presentation attribute, wherein the determining is based on at least one of a set of electronic document properties corresponding to the electronic document and the at least one presentation attribute of the intended use of the physical reproduction of the electronic document.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for evaluating a printing configuration for an electronic document in which one or more presentation attributes of a physical reproduction (e.g., a printed copy) of the electronic document are considered. A perceived quality of the physical reproduction of the electronic document can be determined using a set of properties of the electronic document and the one or more presentation attributes. The perceived quality can be utilized in various ways as part of a printing process. As used herein, unless otherwise noted, the term "set" means one or more (i.e., at least one) and the phrase "any solution" means any now known or later developed solution.

Figure 1:
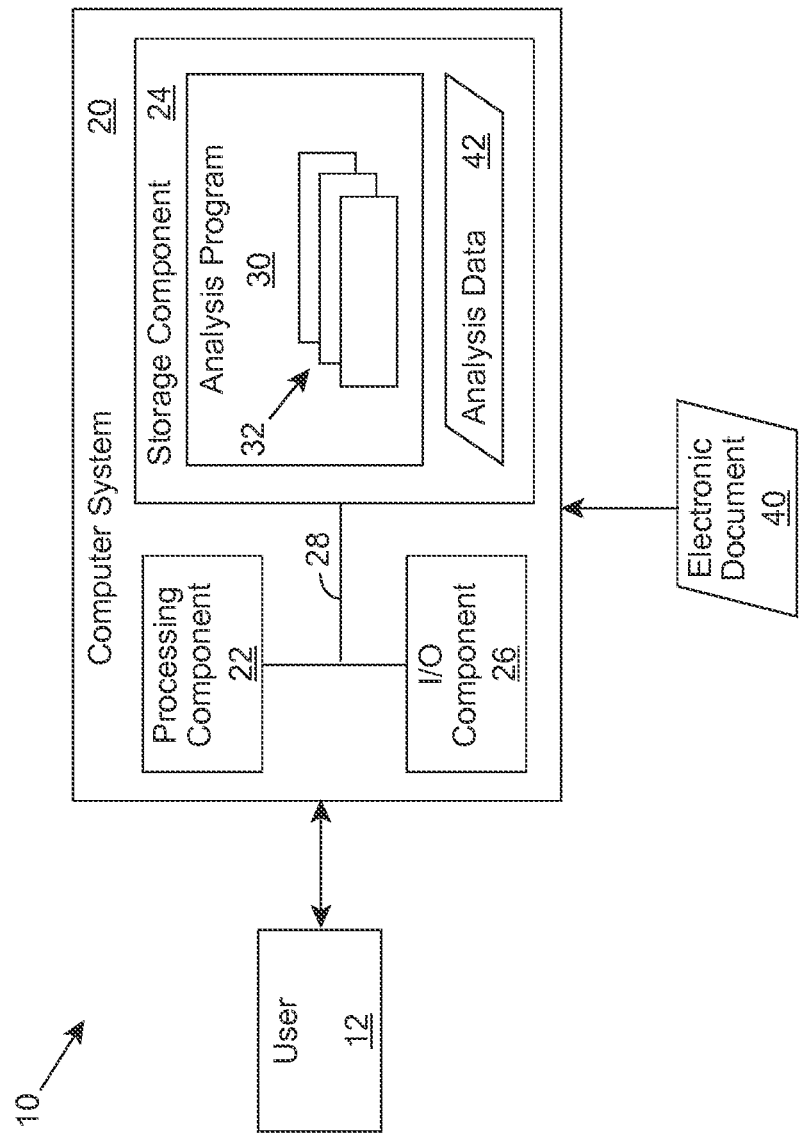
FIG. 1 shows an illustrative environment for determining a perceived quality for a physical reproduction of an electronic document according to an embodiment.

Turning to the drawings, FIG. 1 shows an illustrative environment 10 for determining a perceived quality for a physical reproduction of an electronic document 40 according to an embodiment. To this extent, environment 10 includes a computer system 20, which can perform a process described herein in order to determine the perceived quality for the physical reproduction of the electronic document 40. In particular, computer system 20 is shown including an analysis program 30, which makes computer system 20 operable to determine the perceived quality for the physical reproduction of the electronic document 40 by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as analysis program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, computer system 20 can manage a set of interfaces (e.g., graphical user interface(s), application program interface, and/or the like) that enable human and/or system users 12 to interact with analysis program 30. Furthermore, computer system 20 can manage (e.g., store, retrieve, create, manipulate, organize, present, etc.) the data, such as analysis data 42, using any solution.

In any event, computer system 20 can comprise one or more general purpose computing articles of manufacture (e.g., computing devices) capable of executing program code, such as analysis program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, analysis program 30 can be embodied as any combination of system software and/or application software.

Computer system 20 can perform a process described herein using a set of task-based components, each of which is configured to perform a set of tasks as part of the process. Furthermore, analysis program 30 can be implemented using a set of modules 32. In this case, a module 32 can comprise program code, which enables computer system 20 to perform a set of tasks as part of the process, and can be separately developed and/or implemented apart from other portions of analysis program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module 32 is a substantial portion of a component that implements the actions. Regardless, it is understood that two or more components, modules, and/or systems may share some/all of their respective hardware and/or software. Additionally, it is understood that some of the functionality discussed herein may not be implemented or additional functionality may be included as part of computer system 20 and/or analysis program 30.

It is understood that computer system 20 and analysis program 30 are only representative of various possible equivalent computer systems that may perform a process described herein. To this extent, in other embodiments, the functionality provided by computer system 20 and analysis program 30 can be at least partially implemented by one or more computing devices that include any combination of general and/or specific purpose hardware with or without program code. In each embodiment, the hardware and program code, if included, can be created using standard engineering and programming techniques, respectively.

When computer system 20 comprises multiple computing devices, each computing device can have only a portion of the components (e.g., one or more modules 32 of analysis program 30) associated therewith. Furthermore, the computing devices can communicate over any type of communications link. Similarly, while performing a process described herein, computer system 20 can communicate with one or more other computer systems, such as a user 12, using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, analysis program 30 enables computer system 20 to determine a perceived quality for a physical reproduction of an electronic document 40. While referred to herein as a document, it is understood that the electronic document 40 can be embodied as any collection of electronic data. For example, the electronic document 40 can comprise any number of one or more data files. Additionally, the electronic document 40 can comprise data stored in any data storage format. For example, the electronic document 40 can include data stored using the page description language (PDL) format, a raster image format, and/or the like. The electronic document 40 can store data, which can be desired to be printed on various types of media for various purposes, including, for example, a poster, a banner, a mounted medium, a billboard, an office document, an advertisement, and/or the like.

Figure 2:
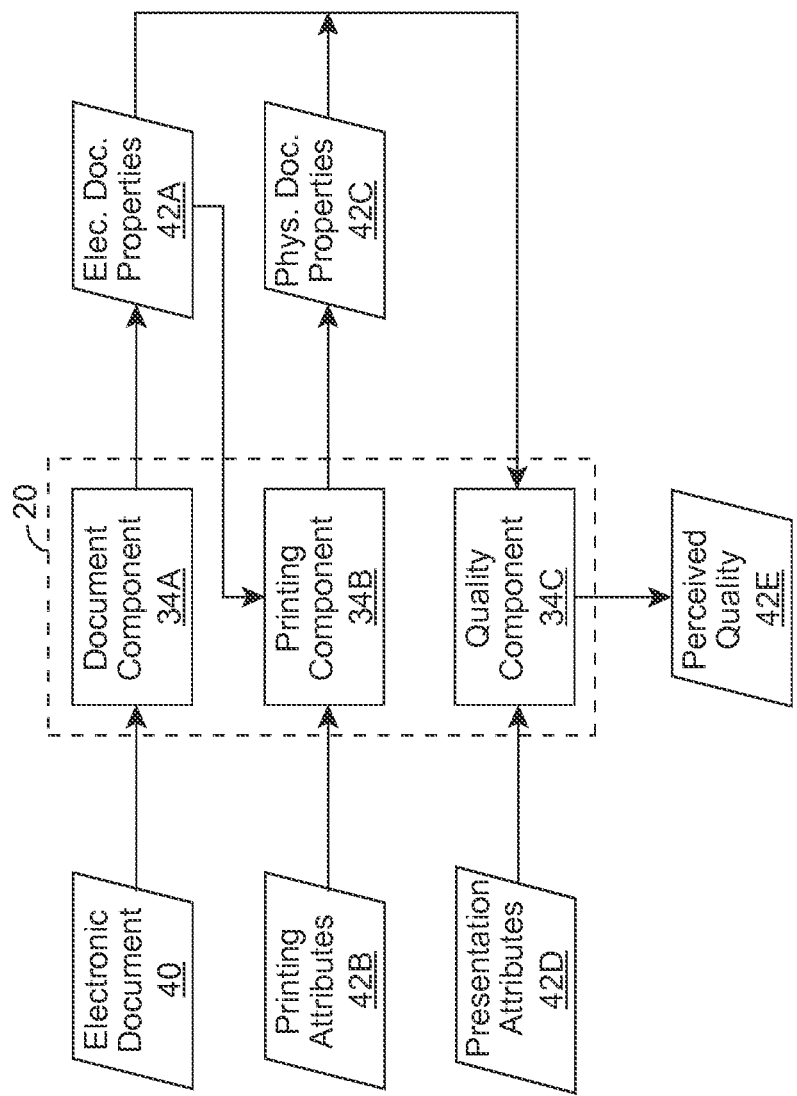
FIG. 2 shows an illustrative data flow diagram for determining a perceived quality for a physical reproduction of an electronic document according to an embodiment.

FIG. 2 shows an illustrative data flow diagram for determining a perceived quality for a physical reproduction (e.g., a printed copy) of an electronic document 40, which can be implemented by the computer system 20 of FIG. 1, according to an embodiment. As illustrated, computer system 20 (e.g., a document component 34A) can analyze the electronic document 40 and determine a set of electronic document properties 42A using any solution. For example, the electronic document 40 can store one or more of the set of electronic document properties 42A as part of its data, and computer system 20 can be configured to read the data from the electronic document 40. Similarly, the computer system 20 can be configured to derive some or all of the electronic document properties 42A from data stored in the electronic document 40 using any solution.

In an embodiment, the computer system 20 can comprise a plurality of format-specific agents, each of which is configured to determine (e.g., calculate, retrieve, and/or the like) the set of electronic document properties 42A from electronic documents 40 including data stored in a corresponding data format. For example, an illustrative format-specific agent can comprise a PDL parser, which is configured to parse electronic documents 40 storing data using the PDL format to acquire/calculate the set of electronic document properties 42A.

The electronic document properties 42A can define various characteristics of the electronic document 40, which are related to printing the electronic document 40. Illustrative electronic document properties 42A can include, for example, a number of pages, a number of images, image resolution information, document data dimensions (e.g., height and width in pixels), electronic color space information, font information, and/or the like.

Additionally, computer system 20 (e.g., a printing component 34B) can acquire a set of printing attributes 42B corresponding to a printing configuration for printing the electronic document 40 using any solution. To this extent, the computer system 20 can provide a user interface, which can enable a human user 12 (FIG. 1) to define some or all of the printing attributes 42B. Similarly, the computer system 20 can interact with a system user 12, such as a print driver or an intermediate system, which communicates the printing attributes 42B to the computer system 20. Furthermore, the computer system 20 can determine some or all of the set of printing attributes 42B from data stored in the electronic document 40. For example, when the electronic document 40 comprises a PDL document, some or all of the set of printing attributes 42B can be included in the PDL document.

The set of printing attributes 42B can include various data related to printing the electronic document 40. For example, the set of printing attributes 42B can include a set of media attributes (e.g., paper type, color, physical dimensions, and/or the like), color/black and white/grayscale printing, any desired transformations to the data stored in the electronic document 40 (e.g., zoom in/out, stretch, brightness, contrast, anti-aliasing, and/or the like), a set of attributes of a target printer for performing the printing, binding information, a number of copies, and/or the like.

In any event, computer system 20 can determine a set of physical document properties 42C from the printing attributes 42B and/or electronic document properties 42A. The set of physical document properties 42C can define various properties of a printed copy of the electronic document 40. For example, the set of physical document properties 42C can define a resolution of the printed copy, a physical size in the printed copy of each pixel of data from the electronic document 40, data corresponding to region(s) of the media that will include printed data, physical color space information, and/or the like.

Furthermore, the set of physical document properties 42C can include a page model of one or more of a set of pages in the printed copy. To this extent, computer system 20 can generate the page model based on the electronic document 40, the electronic document properties 42A, and/or the physical document properties 42C using any solution. In an embodiment, the page model comprises a representation of the printed copy of a page of the electronic document 40. In a more particular embodiment, the representation comprises a bitmap representation of the page. Alternatively, the representation can comprise a set of PDL commands, a vector graphic representation, and/or the like.

Computer system 20 (e.g., a quality component 34C) also can evaluate one or more of the electronic document properties 42A and/or physical document properties 42C and a set of presentation attributes 42D to dynamically determine a perceived quality 42E of a printed copy of the electronic document 40. Computer system 20 can obtain the set of presentation attributes 42D using any solution. For example, computer system 20 can manage a user interface including a set of user interface controls, application programming interface, and/or the like, which enables a user 12 (FIG. 1) to explicitly provide the set of presentation attributes 42D for processing by the computer system 20. Furthermore, computer system 20 can use a default value for one or more of the set of presentation attributes 42D. The default value can be selected based on, for example, one or more physical document properties 42C, such as a size and/or type of the media, a specified intended use for the printed copy, and/or the like. In an embodiment, computer system 20 can determine a value for one or more of the presentation attributes 42D that maximizes the perceived quality 42E of the printed copy of the electronic document, and assign the default value for the one or more of the presentation attributes 42D to the corresponding determined value.

Figure 3:
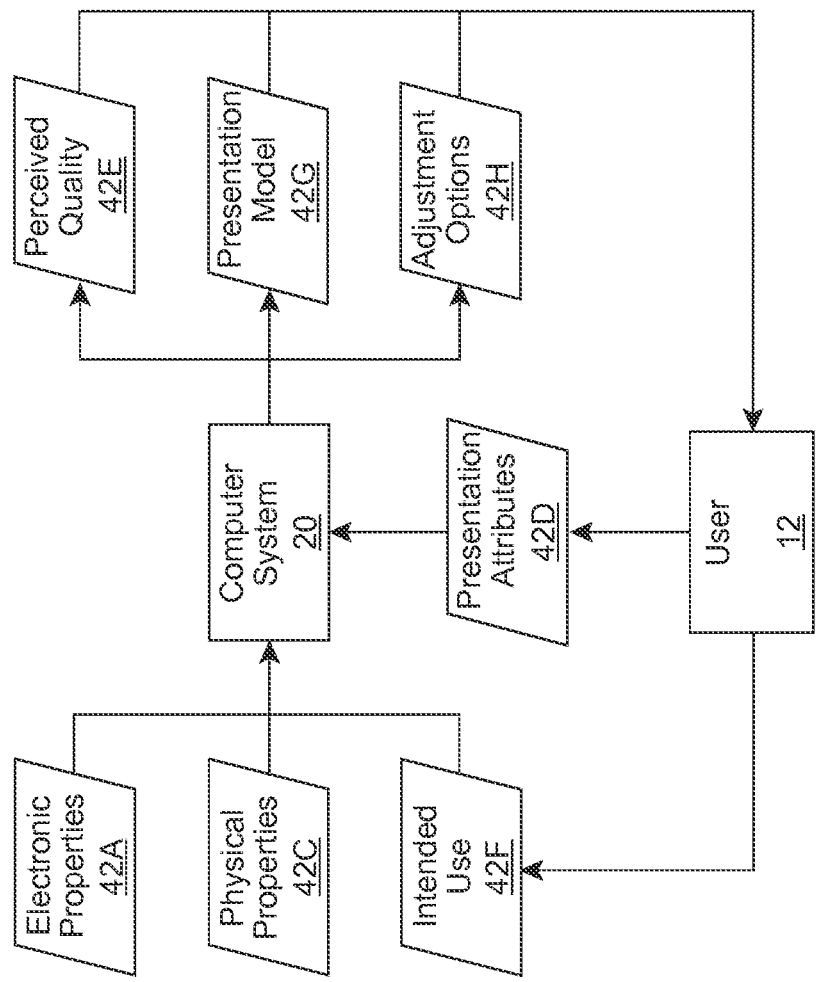
FIG. 3 shows another illustrative data flow diagram for determining a perceived quality for a physical reproduction of an electronic document according to an embodiment.

FIG. 3 shows another illustrative data flow diagram for determining a perceived quality 42E for a physical reproduction of the electronic document 40 according to an embodiment. Additionally, FIG. 4 shows an illustrative user interface for use in determining a perceived quality 42E of a physical reproduction for the electronic document 40 according to an embodiment.

Figure 4:
FIG. 4 shows an illustrative user interface for use in determining a perceived quality for a physical reproduction of an electronic document according to an embodiment.

Referring to FIGS. 3 and 4, the set of presentation attributes 42D can comprise one or more attributes corresponding to a viewing environment during an intended use 42F of the physical reproduction (e.g., printed copy) of the electronic document 40. For example, the set of presentation attributes 42D can include one or more attributes corresponding to a typical location of an observer with respect to the printed copy of the electronic document 40 during the intended use 42F. Such observer location-related attributes can include, for example, an approximate distance of an observer from the printed copy, a relative position of the observer with respect to the printed copy (e.g., expressed as a horizontal angle, horizontal distance from a designated location on the printed copy, and/or the like), a viewing angle between the observer and a designated location (e.g., a center point) on the printed copy (e.g., expressed as a vertical angle, vertical distance from a designated location on the printed copy, and/or the like), and/or the like.

The set of presentation attributes 42D also can include one or more attributes corresponding to a display environment during the intended use 42F of the printed copy. The display-related attributes can include, for example, an attribute of the ambient environment (e.g., outdoor, indoor lighted, indoor dark, and/or the like), a set of attributes corresponding to a light source for the printed copy and/or display environment (e.g., a brightness of the light source, a type of the light source, a color of the light source, directed or ambient illumination of the printed copy, a relative location of the light source to the printed copy (e.g., backlit, directed from above/below, horizontal and/or vertical angles, and/or the like), and/or the like), a visibility of the display environment (e.g., is visibility in the display environment hindered by smoke, fog, and/or the like), and/or the like.

The computer system 20 can determine the perceived quality 42E (FIG. 2) using any solution. For example, the computer system 20 can generate a presentation model 42G (e.g., a bitmap) based on one or more of the presentation attributes 42D and the page model for a corresponding page of the printed copy, e.g., by adjusting one or more aspects of the page model based on one or more of the presentation attributes 42D. In particular, based on the observer location-related attributes, the computer system 20 can enlarge/reduce a size of the page model to generate the presentation model 42G. Furthermore, based on the relative position and/or viewing angle of the observer, the computer system 20 can skew the page model in a horizontal and/or vertical direction to generate the presentation model 42G. Similarly, based on one or more of the display-related attributes, computer system 20 can increase/decrease a contrast and/or brightness of the page model to account for a visibility and/or brightness of the display environment, adjust a hue of the page model to account for use of a colored light source in the display environment, and/or the like, to generate the presentation model 42G.

Computer system 20 can analyze the presentation model 42G to determine a perceived quality 42E (FIG. 2) for the printed copy using any solution. For example, the computer system 20 can analyze color information stored in the presentation model 42G to determine whether an observer will be able to distinguish adjacent color areas (e.g., by using a minimum threshold change between color values), identify a disparity between the original color space for the electronic document 40 and the color space that will be perceived by the observer, and/or the like. Additionally, the computer system 20 can analyze the presentation model 42G to: determine whether line spacing is sufficient to be distinguished by the observer; determine whether anti-aliasing will successfully smooth lines from the perspective of the observer, make the image blurry looking, and/or the like. When an electronic document 40 includes multiple pages, computer system 20 can use all of the pages, select one or more representative pages, and/or the like. For example, computer system 20 can automatically select the first page or a page having the most data as a representative page, enable a user 12 to select a representative page, and/or the like. It is understood that generation and use of the presentation model 42G in the analysis as well as the various factors described herein as being analyzed are only illustrative of various approaches and factors that computer system 20 can consider in determining the perceived quality 42E for the printed copy.

As discussed herein, computer system 20 can determine a perceived quality 42E for the printed copy using the presentation attributes 42D. In an embodiment, computer system 20 can calculate a value for the perceived quality 42E, which is indicative as to whether the printed copy is likely, may or may not be, or is unlikely to be acceptable for the intended use 42F. For example, computer system 20 can use a numeric scale to individually evaluate each of the presentation attributes 42D, and the resulting evaluations can be combined to calculate the perceived quality 42E. Additionally, computer system 20 can use a weighted formula to combine the evaluations according to a relative importance of each presentation attribute 42D to the perceived quality 42E. In response to calculating the value for the perceived quality 42E, computer system 20 can provide a warning message for presentation to a user 12 (FIG. 1), identify a set of adjustment options 42H, which can be used to change (e.g., improve) the perceived quality 42E, and/or the like.

Furthermore, computer system 20 can generate a quality preview for presentation to a user 12 based on the presentation model 42G. In an embodiment, as shown in FIG. 4, computer system 20 manages a user interface (e.g., a web page), which includes both a set of user interface controls for enabling a user 12 to provide one or more presentation attributes 42D and a preview area, which displays the presentation model 42G. The presentation model 42G can be configured to approximate how the printed copy will look to an observer during the intended use 42F (e.g., as defined by the observer location and/or display environment attributes defined using the user interface).

In an embodiment, the computer system 20 can enable a user 12 to select an intended use 42F, which defines a set of observer location and/or display environment attributes corresponding to the intended use 42F. Similarly, the computer system 20 can enable the user 12 to define/change the various presentation attributes 42D and save a set of presentation attributes 42D as a new/revised intended use 42F. Regardless, in response to a selection/change to the presentation attributes 42D and/or intended use 42F, computer system 20 can update the presentation model 42G according to the presentation attributes 42D and redisplay the presentation model 42G in the user interface for presentation to the user 12. In another embodiment, the computer system 20 can provide one or more presentation attributes 42D, which computer system 20 has determined would maximize the perceived quality 42E of the printed copy of the electronic document 40, for use by the user 12. For example, computer system 20 can generate a user interface, which displays the one or more presentation attributes 42D. Subsequently, the user 12 can select to use the one or more presentation attributes 42D, change one or more of the presentation attributes 42D, assign value(s) to one or more previously unassigned presentation attributes 42D, and/or the like. Subsequently, computer system 20 can determine the impact of any change(s) made by the user 12 on the perceived quality 42E.

As discussed herein, computer system 20 can evaluate the electronic document properties 42A, physical document properties 42C, and/or the presentation attributes 42D to determine a perceived quality 42E (FIG. 2) of a printed copy of at least one page of the electronic document 40 (FIG. 2). When computer system 20 determines that the perceived quality 42E may be unacceptable to the user 12 (e.g., too low or overly high), computer system 20 can present a set of adjustment options 42H for presentation to the user 12, each of which can result in a change to the perceived quality 42E. Similarly, a user 12 can request that the computer system 20 suggest a set of adjustment options 42H, which can change the perceived quality 42E (regardless of whether it is currently acceptable or unacceptable). The set of adjustment options 42H can include, for example, one or more possible changes to the electronic document 40, one or more possible changes to the printing process (e.g., printing attributes 42B (FIG. 2)) for generating the printed copy of the electronic document 40, and/or one or more possible changes to the presentation attributes 42D currently defined for the printed copy.

To this extent, computer system 20 can present a change in one or more colors included in the electronic document 40, a resolution of the electronic document 40, a size/type of a font included in the electronic document 40, and/or the like. Similarly, computer system 20 can present a change in a media selected for the printed copy, a printer designated to generate the printed copy, and/or the like. Furthermore, computer system 20 can present a change to the distance of the observer from the printed copy, one or more lighting attributes, and/or the like.

Figure 5:
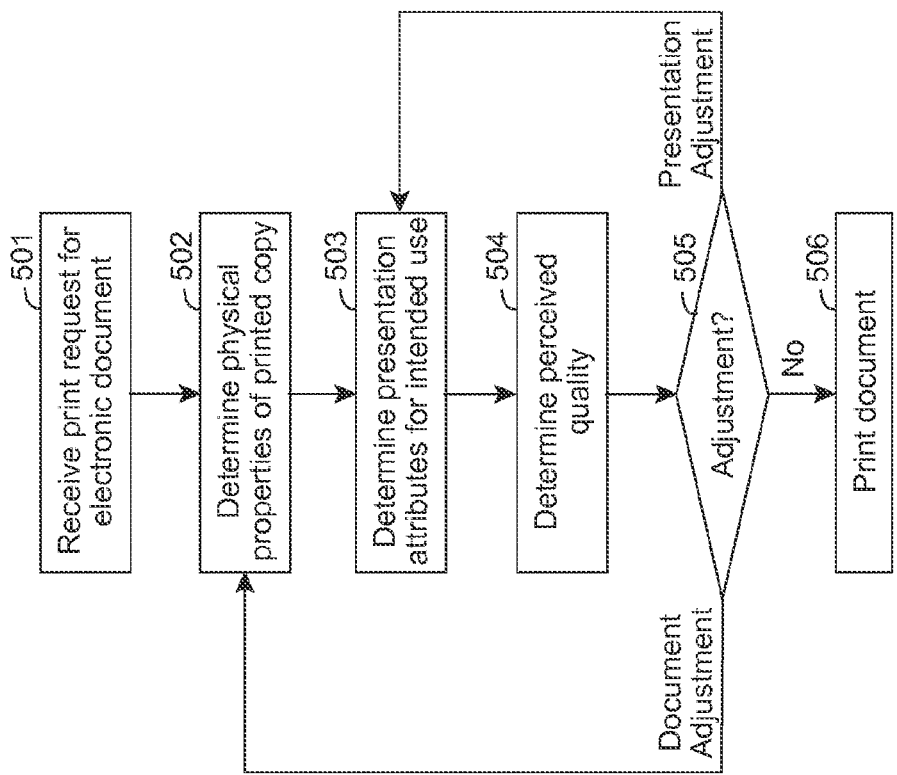
FIG. 5 shows an illustrative process for printing an electronic document according to an embodiment.

As described herein, the determination of a perceived quality for a printed copy of an electronic document 40 can be performed as part of a process for printing the electronic document 40. To this extent, FIG. 5 shows an illustrative process for printing an electronic document 40, which can be implemented by computer system 20 (FIG. 1), according to an embodiment. In process 501, computer system 20 can obtain a print request for an electronic document 40 using any solution (e.g., via a user interface, API, and/or the like), which can define a printing configuration (e.g., printer, media, etc.) for the electronic document 40. In response to receiving the print request, in process 502, computer system 20 can determine a set of physical document properties 42C (FIG. 2) of a printed copy of the electronic document 40 using any solution, and in process 503, computer system 20 can determine a set of presentation attributes 42D (FIG. 2) for an intended use of the printed copy using any solution.

In process 504, computer system 20 can determine a perceived quality 42E (FIG. 2) for the printed copy of the electronic document 40 using any solution. For example, as described herein, computer system 20 can calculate a metric based on the electronic document 40, set of physical document properties 42C, and/or set of presentation attributes 42D, which is indicative of how the printed copy will be perceived by a typical observer. In response to the calculation, computer system 20 can continue with the printing process (e.g., when the perceived quality 42E is indicative that the electronic document 40 is highly likely to be perceived as acceptable), present a result of the calculation for use by the user 12, and/or the like. Furthermore, the computer system 20 can present a preview of the printed copy to the user 12, which is configured to approximate the perceived quality of the printed copy during the intended use.

In process 505, the user 12 can select to make one or more adjustments to the electronic document 40, printing process, and/or presentation attributes 42D. For example, the computer system 20 can present a set of adjustment options, each of which can result in a change (e.g., an increase) in the perceived quality of the printed copy. Similarly, computer system 20 can present one or more adjustment options that may adversely impact the perceived quality (e.g., when the perceived quality is very high), but may result in a cost savings for the printing process. In response, the user 12 can select one or more of the adjustment options, and computer system 20 can return to update the physical properties of the printed copy and/or the presentation attributes in response to the adjustment(s). Once the perceived quality of the printed copy is acceptable to the user 12, computer system 20 can proceed with printing the document in process 506.

By determining the perceived quality using a process described herein, computer system 20 can reduce printed document waste by mitigating instances where the resulting printed copy is perceived as unacceptable by a user 12. Additionally, computer system 20 can lead to higher user 12 satisfaction by giving the user 12 clear choices and perceived quality ramifications of available document configurations, processing and finishing options. Furthermore, computer system 20 can utilize the perceived quality to suggest other products and/or applications, which are better suited for generating a printed copy of the electronic document 40 having the electronic document properties 42A given a set of presentation attributes 42D.

While primarily shown and described herein as a method and system for determining a perceived quality of a printed copy of an electronic document, it is understood that aspects of the invention further provide various alternative embodiments. In one embodiment, the perceived quality of other types of physical reproductions of an electronic document 40 can be determined. For example, the perceived quality of a three-dimensional object can be determined from an electronic document 40 from which the three-dimensional object is to be created. The electronic document 40 can comprise, for example, an image file, from which a three-dimensional rendering will be generated. The three-dimensional rendering can be, for example, carved out of a translucent material, such as a polymer, a plastic, and/or the like, according to the image data (e.g., pixel data values) stored in the electronic document 40. Subsequently, the three-dimensional rendering can be backlit to reproduce a grayscale equivalent of the image data stored in the electronic document 40. Similarly, the electronic document 40 can comprise data defining a three-dimensional object, such as a computer-aided design (CAD) file. A three-dimensional printing process can be used to create a three-dimensional object from the electronic document 40, which can be intended for presentation in a display environment. In either case, computer system 20 can determine a perceived quality of the three-dimensional object using the set of presentation attributes and the set of electronic document properties 40 and a process as described herein. However, it is understood that computer system 20 can further account for various three-dimensional attributes of the physical reproduction, such as its width at one or more locations, as well as one or more additional presentation attributes, such as any shadows resulting from the lighting, and/or the like.

In another embodiment, the invention provides a computer program fixed in at least one computer-readable medium, which when executed, enables a computer system to determine a perceived quality of a printed copy of an electronic document. To this extent, the computer-readable medium includes program code, such as analysis program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as analysis program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for determining a perceived quality of a printed copy of an electronic document. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method comprising:
   determining, by a computer system including at least one computing device, a set of physical object properties based on an electronic document and a set of reproduction attributes, wherein the electronic document includes data for use in creating a physical object, and wherein the set of reproduction attributes correspond to at least one of: a material; processing; or a machine, identified for use in creating the physical object based on the electronic document;
   obtaining, on the computer system, at least one presentation attribute for the physical object, wherein the at least one presentation attribute corresponds to an intended manner of presenting the physical object to an observer;
   determining, by the computer system, a perceived quality for the physical object in response to obtaining the at least one presentation attribute, wherein the perceived quality determining includes the computer system analyzing an ability of the observer to distinguish a plurality of features present in the physical object when presented in the intended manner based on the set of physical object properties and the at least one presentation attribute; and
   initiating, by the computer system, at least one action based on the perceived quality.

2. The method of claim 1, further comprising determining, by the computer system, a set of electronic document properties corresponding to the electronic document in response to the receiving, wherein the perceived quality determining is further based on the set of electronic document properties.

3. The method of claim 2, further comprising determining, by the computer system, one of a plurality of possible formats for the electronic document, wherein the set of electronic document properties determining is performed by a format-specific agent corresponding to the one of the plurality of possible formats.

4. The method of claim 1, wherein at least one of the set of reproduction attributes is included in the electronic document.

5. The method of claim 1, wherein the obtaining at least one presentation attribute includes using at least one presentation attribute defined by a selected intended use for the physical object.

6. The method of claim 1, wherein the perceived quality determining includes:
   adjusting at least one of the set of physical object properties based on the at least one presentation attribute; and
   analyzing the adjusted set of physical object properties to determine the perceived quality.

7. The method of claim 1, wherein the perceived quality determining includes calculating a value for the perceived quality using a weighted formula combining evaluations of each of a plurality of presentation attributes.

8. The method of claim 1, further comprising receiving a print request, wherein the computer system determines the set of physical object properties and the set of reproduction attributes in response to the print request.

9. The method of claim 8, wherein the at least one action includes providing a set of adjustment options for presentation to a user in response to the perceived quality being potentially unacceptable, wherein the set of adjustment options correspond to at least one of: the material; the processing; or the machine, identified for use in creating the physical object.

10. The method of claim 1, wherein the physical object is a three-dimensional object, and wherein the machine is one of: a carving machine or a three-dimensional printing machine.

11. A system comprising:
    a computer system including:
      a processing component; and
      a storage component operatively connected to the processing component, wherein the storage component includes an analysis program stored thereon, wherein the analysis program enables the computer system to implement a method comprising:
        determining a set of physical object properties based on an electronic document and a set of reproduction attributes, wherein the electronic document includes data for use in creating a physical object, and wherein the set of reproduction attributes correspond to at least one of: a material; processing; or a machine, identified for use in creating the physical object based on the electronic document;
        obtaining at least one presentation attribute for the physical object, wherein the at least one presentation attribute corresponds to an intended manner of presenting the physical object to an observer;
        determining a perceived quality for the physical object in response to obtaining the at least one presentation attribute, wherein the perceived quality determining includes the computer system analyzing an ability of the observer to distinguish a plurality of features present in the physical object when presented in the intended manner based on the set of physical object properties and the at least one presentation attribute; and initiating at least one action based on the perceived quality.

12. The system of claim 11, wherein the analysis program includes a format-specific agent for each of a plurality of possible formats for the electronic document, wherein the method further includes determining a set of electronic document properties corresponding to the electronic document using the format-specific agent for a format of the electronic document, wherein the perceived quality determining is further based on the set of electronic document properties.

13. The system of claim 11, wherein the obtaining at least one presentation attribute includes using the at least one presentation attribute defined by a selected intended use for the physical object.

14. The system of claim 11, wherein the perceived quality determining includes:
   adjusting at least one of the set of physical object properties based on the at least one presentation attribute; and
   analyzing the adjusted set of physical object properties to determine the perceived quality.

15. The system of claim 11, wherein the perceived quality determining includes calculating a value for the perceived quality using a weighted formula combining evaluations of each of a plurality of presentation attributes.

16. The system of claim 11, further comprising receiving a print request, wherein the computer system determines the set of physical object properties and the set of reproduction attributes in response to the print request.

17. The system of claim 16, wherein the at least one action includes providing a set of adjustment options for presentation to a user in response to the perceived quality being potentially unacceptable, wherein the set of adjustment options correspond to at least one of: the material; the processing; or the machine, identified for use in creating the physical object.

18. The system of claim 11, wherein the physical object is a three-dimensional object, the system further comprising the machine, wherein the machine is one of: a carving machine or a three-dimensional printing machine.

19. The system of claim 11, wherein the physical object comprises a printed copy of the electronic document, the system further comprising the machine, wherein the machine is a printer.

20. A computer program comprising program code stored on at least one non-transitory computer-readable medium, which when executed, enables a computer system to implement a method comprising:
   determining a set of physical object properties based on an electronic document and a set of reproduction attributes, wherein the electronic document includes data for use in creating a physical object, and wherein the set of reproduction attributes correspond to at least one of: a material; processing; or a machine, identified for use in creating the physical object based on the electronic document;
   obtaining at least one presentation attribute for the physical object, wherein the at least one presentation attribute corresponds to an intended manner of presenting the physical object to an observer;
   determining a perceived quality for the physical object in response to obtaining the at least one presentation attribute, wherein the perceived quality determining includes the computer system analyzing an ability of the observer to distinguish a plurality of features present in the physical object when presented in the intended manner based on the set of physical object properties and the at least one presentation attribute; and
   initiating at least one action based on the perceived quality.

* * * * *